United States Patent
Pfeilschifter

(10) Patent No.: US 12,447,915 B2
(45) Date of Patent: Oct. 21, 2025

(54) VEHICLE ELECTRICAL SYSTEM WITH HIGH-VOLTAGE ZONE AND A PLURALITY OF LOW-VOLTAGE ZONES THAT EXTEND THEREFROM AND ARE CONNECTED VIA A SAFETY DEVICE

(71) Applicant: Vitesco Technologies GmbH, Regensburg (DE)

(72) Inventor: Franz Pfeilschifter, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 24 days.

(21) Appl. No.: 18/570,413

(22) PCT Filed: May 24, 2022

(86) PCT No.: PCT/EP2022/064055
§ 371 (c)(1),
(2) Date: Dec. 14, 2023

(87) PCT Pub. No.: WO2022/263126
PCT Pub. Date: Dec. 22, 2022

(65) Prior Publication Data
US 2024/0270186 A1  Aug. 15, 2024

(30) Foreign Application Priority Data
Jun. 18, 2021  (DE) .................. 10 2021 206 270.9

(51) Int. Cl.
*B60R 16/03* (2006.01)
*B60L 1/00* (2006.01)
(Continued)

(52) U.S. Cl.
CPC ............. *B60R 16/03* (2013.01); *B60L 1/00* (2013.01); *B60L 3/04* (2013.01); *B60L 58/20* (2019.02);
(Continued)

(58) Field of Classification Search
CPC .... B60R 16/03; B60R 16/033; H02J 2310/46; H02J 2310/48; B60L 1/00; B60L 3/04;
(Continued)

(56) References Cited

U.S. PATENT DOCUMENTS 8,629,714 B2  1/2014  Ng et al.
9,941,692 B2  4/2018  Walter
(Continued)

FOREIGN PATENT DOCUMENTS

DE  102010030452 A1  5/2011
DE  102013214835 A1  2/2015
(Continued)

OTHER PUBLICATIONS

International Search Report and Written Opinion for International Application No. PCT/EP2022/064055, mailed Sep. 20, 2022, 18 pages.
(Continued)

*Primary Examiner* — Ryan Johnson
(74) *Attorney, Agent, or Firm* — Buchanan Ingersoll & Rooney PC

(57) ABSTRACT

A vehicle electrical system is equipped with a high-voltage zone, a first low-voltage zone extending out of the high-voltage zone, a second low-voltage zone, and a safety device. The safety device connects the first low-voltage zone to the second low-voltage zone. The safety device has a galvanic isolation component or a voltage limiting element.

14 Claims, 1 Drawing Sheet

(51) Int. Cl.
  *B60L 3/04*       (2006.01)
  *B60L 58/20*      (2019.01)
  *B60R 16/033*     (2006.01)
  *H02H 9/04*       (2006.01)
(52) U.S. Cl.
  CPC .............. *B60R 16/033* (2013.01); *H02H 9/04* (2013.01); *H02J 2310/48* (2020.01)
(58) Field of Classification Search
  CPC .......... H02H 9/04; H02H 9/041; H02H 9/044; H02H 9/045
  See application file for complete search history.

(56) References Cited

U.S. PATENT DOCUMENTS

| | | | |
|---|---|---|---|
| 10,966,285 B2 | 3/2021 | Hammerschmidt et al. | |
| 11,415,351 B2 | 8/2022 | Werker et al. | |
| 2003/0032308 A1* | 2/2003 | Tamai | H02J 1/08 439/34 |
| 2011/0115287 A1 | 5/2011 | Morita et al. | |
| 2022/0185209 A1 | 6/2022 | Schneider et al. | |

FOREIGN PATENT DOCUMENTS

| | | |
|---|---|---|
| DE | 102016212656 A1 | 1/2018 |
| DE | 102018211007 B3 | 8/2019 |
| DE | 102018210943 A1 | 1/2020 |
| DE | 102019105504 A1 | 9/2020 |
| DE | 102020004730 A1 | 11/2020 |
| EP | 1291998 A2 | 3/2003 |

OTHER PUBLICATIONS

International Search Report and Written Opinion for International Application No. PCT/EP2022/064055, mailed Sep. 20, 2022, 15 pages (German).

German Examination Report for German Application No. 10 2021 206 270.9, dated Jan. 26, 2022 with translation, 20 pages.

Office Action (Notice to Submit Response) issued on Mar. 17, 2025, by the Korean Intellectual Property Office in corresponding Korean Patent Application No. 10-2024-7001280 and an English translation of the Office Action. (8 pages).

* cited by examiner

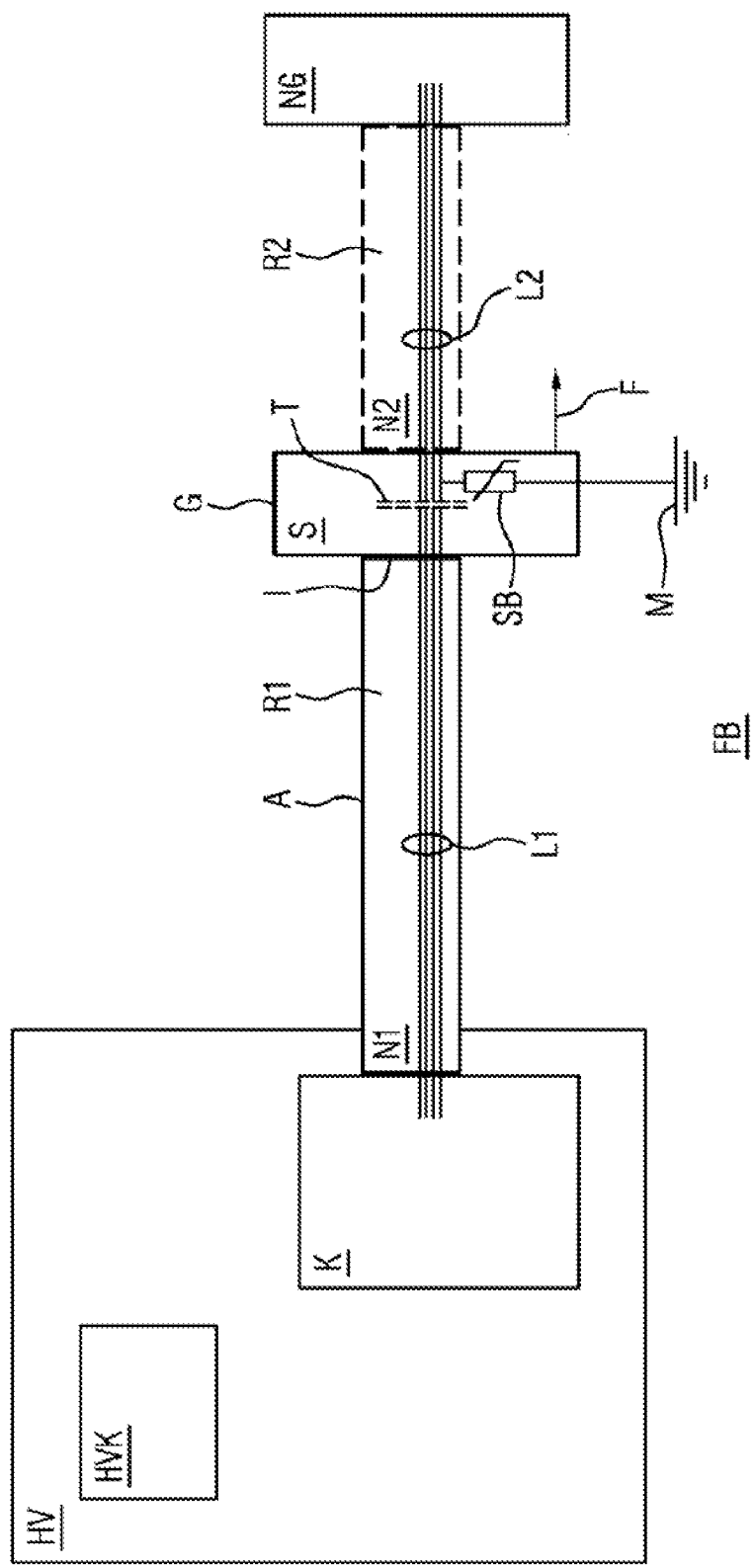

VEHICLE ELECTRICAL SYSTEM WITH HIGH-VOLTAGE ZONE AND A PLURALITY OF LOW-VOLTAGE ZONES THAT EXTEND THEREFROM AND ARE CONNECTED VIA A SAFETY DEVICE

CROSS REFERENCE TO RELATED APPLICATIONS

This application is the U.S. National Phase Application of PCT International Application No. PCT/EP2022/064055, filed May 24, 2022, which claims priority to German Patent Application No. 10 2021 206 270.9, filed Jun. 18, 2021, the contents of such applications being incorporated by reference herein.

BACKGROUND OF THE INVENTION

It is known practice to equip vehicles with an electrical traction drive in which a high-voltage rechargeable battery is used as the power source. In order to protect the vehicle user, the connections that carry high-voltage potentials are insulated and may also have other protective measures. In addition, an insulation monitor is usually used, which detects the insulation resistance of the high-voltage potentials with respect to the vehicle ground in order that further measures can be taken in the event of excessively low insulation values.

SUMMARY OF THE INVENTION

Since the contact voltages in the event of a fault can be very high and pose a great danger to the user, an aspect of the invention aims to enhance the safety of a vehicle that has a high-voltage electrical system.

It has been recognized that high-voltage components, i.e. components that carry high-voltage potentials in normal operation, can be sufficiently isolated electrically from the users by insulation and suitable housings, so that there is a high degree of safety in this respect. However, in the spatial area in which components with high-voltage potential are also located, low-voltage components and low-voltage cables are also present that are routed away from the high-voltage on-board electrical system. If a fault occurs within the high-voltage zone, so that these low-voltage cables carry a high-voltage potential, there is a higher risk of electric shock, as the low-voltage cables are not insulated and secured to the same extent as the high-voltage cables. It is therefore proposed that a first low-voltage zone extending out of the high-voltage zone is first connected to a safety device, which a second low-voltage zone extends away from. The safety device can ensure, by means of measures such as galvanic isolation or by means of a voltage limiting element, that in the event of an insulation fault between the first low-voltage zone and the high-voltage zone dangerous voltages do not propagate beyond the safety device, so that the safety device blocks such dangerous voltages from reaching the second, additional low-voltage zone. This makes it possible to define a further zone which—despite low-voltage operation in the fault-free case—is exposed to the risk of carrying high voltages in order to protect this zone from external access, while the second low-voltage zone, due to the safety device, is protected to a greater extent by the safety device against high voltages that occur in the event of faults. According to the invention, this takes into account the fact that even a first low-voltage zone can carry high-voltage voltages in the event of faults within the high-voltage zone. It is proposed to stop the propagation path of these dangerous voltages by means of the safety device, in order to achieve greater safety against high-voltage voltages for the second low-voltage zone, which can spread from the high-voltage zone into the first low-voltage zone due to faults.

Therefore, a vehicle electrical system with a high-voltage zone, a first low-voltage zone and a second low-voltage zone is described. The first low-voltage zone extends out of the high-voltage zone. The low-voltage zones refer in particular to physical sections in which low-voltage components and/or low-voltage cables are located. The second low-voltage zone does not extend directly out of the high-voltage zone, but adjoins (indirectly) the first low-voltage zone. In the event of an insulation fault, the first low-voltage zone can be provided with a high-voltage potential of the high-voltage zone. In order to prevent the high-voltage potential concerned from also affecting the second low-voltage zone, the vehicle electrical system comprises a safety device. The second low-voltage zone is connected to the first low-voltage zone via this device. There is no further (galvanically conductive) connection between the second low-voltage zone and the first low-voltage zone.

As a result, the safety device is able to block corresponding, dangerous high-voltage potentials that extend from the high-voltage zone into the first low-voltage zone from reaching the second low-voltage zone. The second low-voltage zone is thus protected by the safety device against high-voltage potentials, which are transmitted from the high-voltage zone into the first low-voltage zone due to an insulation fault. The safety device has a galvanic isolation component and/or a voltage limiting element. The galvanic isolation then exists within the safety device between the first and the second low-voltage zone. The voltage limiting element is provided between a potential of the first and/or second low-voltage zone and a leakage potential, such as ground or chassis, and is activated when the relevant low-voltage zone has a voltage relative to the leakage potential that exceeds a voltage limit. The safety device may also have both of the safety measures mentioned.

In particular, the safety device also physically separates the second low-voltage zone from the first low-voltage zone. The safety device is preferably located between the first and the second low-voltage zone and forms a safety zone which extends between the first and the second low-voltage zone. These zones can be defined by boundaries such as housings and the like.

In one embodiment, the first low-voltage zone encloses all low-voltage cables which are routed out of the high-voltage zone. The second low-voltage zone encloses all cables and/or components that are functionally connected, that is, in particular, for signal transmission or supply voltage transmission, to the relevant cables and/or components of the first low-voltage zone. A plurality of safety devices may be provided, to each of which a portion of the first low-voltage cables are connected, wherein preferably all low-voltage cables that extend out of the high-voltage zone are connected to one of the safety devices so that all such low-voltage cables are protected or end at a safety device.

The vehicle electrical system may comprise a low-voltage unit, for example, a control unit for controlling a component of the high-voltage zone or for acquiring sensor data that originate from within the high-voltage zone. Furthermore, the low-voltage unit may have a communication device, such as a bus communication module, in particular a CAN bus slave or CAN bus master. The low-voltage unit may also be, for example, a display or an input instrument, which is connected functionally or for signal transmission to a component within the high-voltage zone, for example, a voltage display or a display device, which can also inter alia display the voltage in the high-voltage zone. The low-voltage unit can also be a low-voltage supply that supplies a component within the high-voltage zone with a low voltage (via the first and second low-voltage zones).

The low-voltage unit is connected to the second low-voltage zone. The second low-voltage zone connects the low-voltage unit to the safety device. The low-voltage zone is provided between the low-voltage unit and the safety device. The low-voltage unit is connected via the second low-voltage zone and the safety device connected to it to the first low-voltage zone. This leads in turn to the high-voltage zone. The first low-voltage zone, the safety device and the second low-voltage zone are therefore provided between the low-voltage unit and the high-voltage zone (in particular starting from the high-voltage zone in this sequence). Via the second low-voltage zone, the safety device and the first low-voltage zone, the low-voltage unit is connected for signal transmission and/or voltage supply to the high-voltage zone or to components that are located within the high-voltage zone. These components are in particular low-voltage components that are located in the high-voltage zone. A signal-transmitting connection refers here to a galvanically isolating data connection. Furthermore, the voltage-supplying connection can also be galvanically isolating, namely, by the safety device having a galvanic isolation component in the form of a transformer (galvanically isolating). The galvanic isolation may be provided, for example, by a galvanically isolating transformer of the safety device, the one side (primary side, for example) of which is connected to the first low-voltage zone, and the second side (secondary side) of which is connected to the second low-voltage zone. In addition, an optocoupler can be used as the galvanic isolation component, which connects the two low-voltage zones to each other for signal transmission. The transformer mentioned may be a transmitter for signal transmission, or may be a transformer for transmitting electrical power, or both (for example in the case of Powerline communications).

The low-voltage zones have cables, in particular signal cables, communication cables, sensor cables and/or low-voltage supply cables. The cables are designed for an operating voltage of less than 60 V and therefore have no high-voltage insulation. In particular, the insulation of the cables is designed for low-voltage and not high-voltage applications. The first low-voltage zone has cables that connect one or more low-voltage components located in the high-voltage zone to the safety device. This connection is galvanically conductive. In the event of a fault within the high-voltage zone, one cable of the first low-voltage zone can therefore have a high-voltage potential, which is routed only as far as the safety device. This then blocks the high-voltage potential. The second low-voltage zone also has cables that are connected to the safety device. The cables of the second low-voltage zone are thus connected to the cables of the first low-voltage zone via the safety device. The connection thus established by the safety device is galvanically isolating. Signal cables are therefore connected to a data transmission unit via a galvanically isolating transmitter or preferably via optocouplers. Low-voltage supply cables can be connected via a galvanically isolating transformer. The safety device connects each cable of the first low-voltage zone to the relevant cable of the second low-voltage zone in a galvanically isolating manner. Each cable of the first low-voltage zone has an equivalent in the second low-voltage zone, so that each low-voltage cable of the first low-voltage zone, which is located in the high-voltage zone, has an equivalent in the second low-voltage zone. The cables can be realized as wires and/or as conductor tracks, in particular of flex-foil printed circuit boards. The vehicle electrical system comprises in particular one or more low-voltage units which are connected to the safety device via the second low-voltage zone. As mentioned, the low-voltage unit can be a display, a control unit, an HMI unit, an input or similar. The low-voltage unit may be present in particular in, or adjacent to, a compartment to which the user has easy access, such as the vehicle interior, the engine compartment, the trunk and the like.

A further aspect is the spatial separation of the two low-voltage zones by the safety device. In particular, one aspect involves providing the first low-voltage zone (which can give rise to a high-voltage potential in the event of a fault) in a first compartment that is not readily accessible to the user. It may therefore be provided that the first low-voltage zone is provided in a first compartment which is protected from external access (by the vehicle user) by a continuous boundary. The continuous boundary may be provided by covers or the like, which cannot be opened by the user during normal use of the vehicle, and which in particular require a tool. This ensures that the user has no access to the low-voltage zone during normal use of the vehicle. As a result, accidental contact can be avoided. The continuous boundary of the low-voltage zone can be provided by a plastic cover or a metallic (earthed) cover, as well as by walls that, together with the cover, completely enclose the compartment. These walls preferably have no opening or only openings which can only be opened with tools and not without difficulty. In summary, the first compartment is closed off and cannot be opened in normal operation, in particular not without tools.

The second low-voltage zone is provided in a second compartment. This can be open and is in particular freely accessible from outside. The second compartment is easily accessible to the user during normal use, in particular the engine compartment, the passenger compartment, the trunk and the like. For example, a 12 V battery or 12 V units may be provided in the engine compartment in the second compartment. When the hood is opened, these components are accessible without the need for additional tools. In particular, there is no need for a cover that closes off the second compartment and thus makes it inaccessible without tools. The safety device is preferably provided in a separate housing. This housing is located between the first and second compartments. In particular, the first compartment impinges directly on its own housing. The second compartment also preferably impinges on the housing of the safety device, but the first compartment remains separated from the second. The physical separation of the first compartment from the second compartment allows effective protection by the safety device.

Another option is to provide the safety device in a housing located in the first compartment. In particular, the housing in which the safety device is provided may be located on an inner side of the first compartment. This is in particular the inner side of an outer wall of the first compartment or an outer wall of the boundary of the first compartment. The second low-voltage zone can then be routed through the wall that constitutes this inner side or through this outer wall to connect to the safety device. The fact that the safety device is located directly on an outer wall of the first compartment ensures that the second low-voltage zone has no connection to the first low-voltage zone. The safety device may be provided in particular in a housing which is located on the inner side of an outer wall of a high-voltage housing, in which not only the high-voltage zone but also the first low-voltage zone is provided. In particular, this applies to the entire first low-voltage zone, which is physically and galvanically separated from the entire second low-voltage zone by the safety device.

In embodiments in which the safety device has at least one voltage limiting element, this element can be provided between low-voltage potentials or cables of the first and/or second zone, and a leakage potential. In this case, when an excessive voltage occurs in the first low-voltage zone, the current in question would be dissipated to the leakage potential. The leakage potential is in particular ground or the chassis. The voltage limiting element can be implemented as a varistor, gas discharge tube, spark gap, protective diode, thyristor circuit, TVS thyristor, DIAC, Zener diode or suppressor diode or four-layer diode.

Multiple voltage limiting elements may be provided in the safety device to protect low-voltage potentials against different polarities of high voltages or to secure multiple cables. When voltage limiting elements are used, the two low-voltage zones are not necessarily galvanically isolated. Instead, it can be provided that when voltage limiting elements are used, the cables of the first low-voltage zone are conductively coupled to the cables of the second low-voltage zone. However, the interposition of the safety device between the two low-voltage zones results in the possibility that if the voltage in the first low-voltage zone is too high, this voltage is reduced or limited by the activation of the voltage limiting element.

The second low-voltage zone remains protected by the discharge of the current resulting from the excessively high voltage in the first low-voltage zone. Resistors or similar may be provided in the safety device, which connect the cables of the first low-voltage zone to the cables of the second low-voltage zone, the voltage limiting elements being preferably provided at the end of the cables of the second low-voltage zone which are connected to the relevant resistors. Then the resistors that connect the two low-voltage zones in series limit the maximum transferable current, and at the same time, if an excessive current occurs (due to high-voltage faults), the current limited by the resistors is dissipated to a reference potential. The resistors, which connect the two low-voltage zones to each other, are preferably designed such that the cables can fulfil their function in fault-free operation, that is, they are configured to transmit the signals or to transmit the supply voltage.

As mentioned above, the vehicle electrical system can comprise a low-voltage unit which is connected to the safety device via the second low-voltage zone. The low-voltage unit can provide a sensor detection unit, an activation unit, a communication device or a monitoring unit, all of which relate to low-voltage components which are arranged in the high-voltage zone. The low-voltage unit is thus provided outside the high-voltage zone, but functionally connected (for data transmission and/or supply voltage transmission) to a low-voltage component that is located within the high-voltage zone. The low-voltage unit itself can be provided in a compartment that is easily accessible to the user in normal use. This applies, for example, to controls of an HMI interface or displays located on the dashboard or in the passenger compartment generally. This also applies to low-voltage units that are located in the engine compartment (or in the trunk) and which the user can easily access with proper usage (after opening the relevant passenger compartment door, the tailgate or the engine compartment cover).

The safety device preferably has a fault output. The safety device is configured to output a high-voltage fault to the fault output if the voltage in at least one of the low-voltage zones exceeds a voltage limit. This may also apply to a voltage that is present on only one conductor of the aforementioned zones. The voltage is referenced to a leakage potential, such as ground or chassis. The voltage limit is preferably less than 60 V, for example 50, 40, 35 or 25 V. The voltage limit is above the maximum level of all cables in the low-voltage zone that occur in fault-free operation. The vehicle electrical system may have discharge or disconnection devices that are functionally connected to the fault signal output. In this case, if a high-voltage fault occurs (in the form of a signal) at the fault signal output, the appropriate action (discharge and/or disconnection) can be carried out. A high-voltage fault occurs when a voltage in a low-voltage zone exceeds a voltage limit of, for example, 60 V DC or 30 Vrms AC.

The prefix "high-voltage" indicates that the component in question is designed for an operating voltage of more than 60 V, at least 100 V, at least 200 V, at least 400 V, at least 600 V or at least 800 V, in particular with regard to the insulation. The prefix "low-voltage" indicates that the component in question is designed for an operating voltage of less than 60 V, not more than 48 V or not more than 24 V or 12 V, in particular with regard to the insulation. These voltage values refer to a DC voltage, but may also refer to the magnitude of an RMS voltage or amplitude of an AC voltage.

A motor vehicle with a purely electric drive or with a hybrid drive which has an electric drive, can have a vehicle electrical system as described here. In the motor vehicle, a high-voltage traction accumulator and a high-voltage traction drive can be provided, both of which are connected to the high-voltage zone of the vehicle electrical system described here. The high-voltage traction accumulator and the high-voltage traction drive are then preferably part of the vehicle electrical system described here.

BRIEF DESCRIPTION OF THE DRAWINGS

The FIGURE is used to explain the subject matter described here by way of example.

DETAILED DESCRIPTION OF THE PREFERRED EMBODIMENTS

The FIGURE shows a vehicle electrical system FB with high-voltage zone HV in which at least one high-voltage component HVK is located. The high-voltage zone is enclosed by a high-voltage housing. The high-voltage zone also contains low-voltage components K, from which cables L1 of a first low-voltage zone N1 originate. The low-voltage zone N1 and thus also its cables L1 extend from the low-voltage components (within the high-voltage zone) out of the high-voltage zone HV. The first low-voltage zone N1 encloses a compartment R1, which is not accessible from the outside under proper usage by the vehicle user. For this purpose, for example, a cover A may be provided, which closes off the first compartment R1 of the low-voltage zone N1. In this case, the cover A closes off this compartment R1 in such a way that the user has no access to the compartment R1 without tools or in the course of normal usage.

A safety device S is connected to the first low-voltage zone N1. This has a housing G. In turn, a second low-voltage zone N2, which has cables L2, is connected to the safety device S. Safety device S is provided in the separate housing G which is located between the first compartment R1 and a second compartment R2 or is located on an inner side I of an outer wall of a boundary B of the first compartment R1. These lead to a low-voltage unit that is located outside the high-voltage zone. The low-voltage unit NG is thus functionally connected to the low-voltage component K (which is located within the high-voltage zone HV). This means that the low-voltage component K can communicate with the low-voltage unit NG, can be supplied with voltage by it and/or can be activated by it. In addition, the component K can also transmit data such as sensor data to the low-voltage unit. The second low-voltage zone N2 is provided in a second compartment R2.

In order to protect the second low-voltage zone N2 from excessively high voltages which can occur if a high voltage comes into contact with a cable L1 of the first low-voltage zone N1 in the high-voltage zone HV, the safety device S comprises a galvanic isolation component T and/or a voltage-limiting element SB. In the case of a galvanic isolation component T, for example, optocouplers and/or galvanically isolating transformers are used. The galvanic isolation component T is represented purely symbolically by means of a dashed line that defines the galvanic isolation as a functional feature. Shown by way of example as a voltage limiting element SB is a varistor, which connects a cable within the safety device S to a reference potential or leakage potential M (ground). If the voltage relative to ground on the cable in question is too high, the voltage limiting element SB then becomes active and dissipates the relevant current to ground. This protects the second low-voltage zone N2 against excessive voltages. In particular, it is possible that the safety device S detects a current flow through the voltage limiting element SB in order to detect a high-voltage fault based on the current flow. This is then issued in the form of a signal to the fault signal output F of the safety device S. While the isolation component T physically prevents a high voltage from reaching the second low-voltage zone N2, the voltage limiting element SB not only allows the reduction of the fault-induced high voltage, but also the detection of the high-voltage fault. Even if only galvanic isolation T is provided, the potentials of the leads L1 of the first low-voltage zone N1 can be monitored in order to output a corresponding fault signal to the fault output F when a voltage limit is exceeded. The safety device S is configured for this purpose.

The invention claimed is:

1. A vehicle electrical system comprising:
a high-voltage zone,
a first low-voltage zone extending out of the high-voltage zone, and
a second low-voltage zone and a safety device, which connects the first low-voltage zone to the second low-voltage zone,
wherein the safety device has a galvanic isolation component or a voltage limiting element,
wherein the safety device has a fault signal output and the safety device is configured to output a high-voltage fault at the fault signal output, and to send said signal to a higher-level vehicle control unit, if the result of a voltage measuring/monitoring device of the safety device in at least one of the low-voltage zones is that a voltage limit is exceeded.

2. The vehicle electrical system as claimed in claim 1, which further comprises at least one low-voltage unit connected to the second low-voltage zone and connected via the second low-voltage zone, the safety device and the first low-voltage zone to low-voltage components in the high-voltage zone for signal transmission and/or voltage supply.

3. The vehicle electrical system as claimed in claim 1, wherein the first low-voltage zone has cables which connect the low-voltage components that are located in the high-voltage zone to the safety device, and the second low-voltage zone has cables which are connected to the safety device.

4. The vehicle electrical system as claimed in claim 1, wherein the second low-voltage zone connects the safety device to at least one low-voltage unit, and
wherein a sensor detection unit for low-voltage components, an activation unit for low-voltage components, a cable-bound communication device which communicates with low-voltage components, or a monitoring unit for low-voltage components are arranged in the high-voltage zone.

5. A vehicle electrical system comprising:
a high-voltage zone,
a first low-voltage zone extending out of the high-voltage zone, and
a second low-voltage zone and a safety device, which connects the first low-voltage zone to the second low-voltage zone,
wherein the safety device has a galvanic isolation component or a voltage limiting element, and
wherein the first low-voltage zone is provided in a first compartment, which is protected from external access by a continuous boundary, and wherein the second low-voltage zone is provided in a second compartment which is freely accessible from the outside, and the safety device is provided in a separate housing which is located between the first compartment and the second compartment or on an inner side of an outer wall of the boundary of the first compartment.

6. The vehicle electrical system as claimed in claim 5, wherein the safety device has a fault signal output and the safety device is configured to output a high-voltage fault at the fault signal output, and to send said signal to a higher-level vehicle control unit, if the result of a voltage measuring/monitoring device of the safety device in at least one of the low-voltage zones is that a voltage limit is exceeded.

7. The vehicle electrical system as claimed in claim 5, which further comprises at least one low-voltage unit connected to the second low-voltage zone and connected via the second low-voltage zone, the safety device and the first low-voltage zone to low-voltage components in the high-voltage zone for signal transmission and/or voltage supply.

8. The vehicle electrical system as claimed in claim 5, wherein the first low-voltage zone has cables which connect the low-voltage components that are located in the high-voltage zone to the safety device, and the second low-voltage zone has cables which are connected to the safety device.

9. The vehicle electrical system as claimed in claim 5, wherein the second low-voltage zone connects the safety device to at least one low-voltage unit, and
wherein a sensor detection unit for low-voltage components, an activation unit for low-voltage components, a cable-bound communication device which communicates with low-voltage components, or a monitoring unit for low-voltage components are arranged in the high-voltage zone.

10. A vehicle electrical system comprising:
a high-voltage zone,
a first low-voltage zone extending out of the high-voltage zone, and a second low-voltage zone and a safety device, which connects the first low-voltage zone to the second low-voltage zone, wherein the safety device has a galvanic isolation component or a voltage limiting element, and wherein the safety device comprises the voltage limiting element and the voltage limiting element comprises a varistor, a gas discharge tube, a spark gap, a protective diode, a thyristor circuit, a TVS thyristor, a DIAC, a Zener diode, a suppressor diode and/or a four-layer diode.

11. The vehicle electrical system as claimed in claim 10, wherein the safety device has a fault signal output and the safety device is configured to output a high-voltage fault at the fault signal output, and to send said signal to a higher-level vehicle control unit, if the result of a voltage measuring/monitoring device of the safety device in at least one of the low-voltage zones is that a voltage limit is exceeded.

12. The vehicle electrical system as claimed in claim 10, which further comprises at least one low-voltage unit connected to the second low-voltage zone and connected via the second low-voltage zone, the safety device and the first low-voltage zone to low-voltage components in the high-voltage zone for signal transmission and/or voltage supply.

13. The vehicle electrical system as claimed in claim 10, wherein the first low-voltage zone has cables which connect the low-voltage components that are located in the high-voltage zone to the safety device, and the second low-voltage zone has cables which are connected to the safety device.

14. The vehicle electrical system as claimed in claim 10, wherein the second low-voltage zone connects the safety device to at least one low-voltage unit, and wherein a sensor detection unit for low-voltage components, an activation unit for low-voltage components, a cable-bound communication device which communicates with low-voltage components, or a monitoring unit for low-voltage components are arranged in the high-voltage zone.

* * * * *